United States Patent [19]
Smith, Jr.

[11] Patent Number: 5,528,964
[45] Date of Patent: Jun. 25, 1996

[54] WRENCH ASSISTING TOOL AND METHOD

[76] Inventor: Jonathan R. Smith, Jr., 849 Highland Ter., NE., Atlanta, Ga. 30306

[21] Appl. No.: 275,766

[22] Filed: Jul. 15, 1994

[51] Int. Cl.$^6$ .................................................. B25B 13/58
[52] U.S. Cl. ....................................... 81/180.1; 81/177.2
[58] Field of Search ...................... 81/52, 177.1, 177.2, 81/180.1

[56] References Cited

U.S. PATENT DOCUMENTS

| | | | |
|---|---|---|---|
| 2,420,682 | 5/1947 | Powell | 81/52 |
| 3,905,254 | 9/1975 | Palatnick et al. | 81/57.3 |
| 4,063,475 | 12/1977 | Perkins | 81/57.22 |
| 4,070,931 | 1/1978 | Florko, Jr. | 81/177 |
| 4,104,936 | 7/1978 | Sjostrom | 81/180.1 |
| 4,274,310 | 6/1981 | Michaud | 81/57.36 |
| 4,305,316 | 12/1981 | Lehman | 81/180.1 |
| 4,733,583 | 3/1988 | Lewis | 81/177.2 |
| 4,738,167 | 4/1988 | Ball | 81/124.2 |
| 4,756,215 | 7/1988 | Darnell | 81/57 |
| 4,819,523 | 4/1989 | Souza | 81/177.2 |
| 5,107,729 | 4/1992 | Makhlouf | 81/57.3 |
| 5,129,290 | 7/1992 | Haviv | 81/57 |
| 5,179,876 | 1/1993 | Gadea Mantilla | 81/57.3 |
| 5,218,730 | 6/1993 | Berry | 7/100 |

*Primary Examiner*—James G. Smith
*Attorney, Agent, or Firm*—Louis T. Isaf; James A. Witherspoon

[57] ABSTRACT

A torque multiplying assist tool engages and pivots about a fulcrum to assist a conventional wrench in operating upon a work-piece. The assist tool functions as a secondary lever by receiving an applied force, pivoting about the fulcrum, and exerting a multiplied force upon the wrench. The wrench includes a grip element that is engaged to the work-piece and a handle extending from the grip element. The multiplied force is applied by way of a linkage assembly to the handle of the wrench causing the wrench to pivot such that torque is applied to the work-piece. In accordance with the preferred embodiments of the present invention, the assist tool is constructed and arranged to cooperate with the wrench to aid in the removal of a lug nut from a vehicle wheel. The work-piece is a lug nut (i.e., a primary lug nut) on the wheel and the fulcrum is another lug nut (i.e., a secondary lug nut) on the same wheel. The assist tool includes a pivot assembly for engaging and pivoting relative to the secondary lug nut and a handle extending from the pivot assembly. In accordance with the first preferred embodiment of the present invention, the linkage assembly extends between the handle of the assist tool and the handle of the wrench, and the wrench is a conventional ratchet wrench. In accordance with the second preferred embodiment of the present invention, the linkage assembly extends between the pivot assembly of the assist tool and the handle of the wrench, and the wrench is a conventional lug wrench. In alternate embodiments an assist tool and wrench are joined so that they remain assembled to one another and generally properly oriented with respect to each other for convenient deployment as a single unit. An improved lug wrench is provided in another alternate embodiment.

24 Claims, 10 Drawing Sheets

WRENCH ASSISTING TOOL AND METHOD

BACKGROUND OF THE INVENTION

The present invention relates generally to the field of tools that grip and apply torque to a work-piece, and more particularly to such tools that provide a mechanical advantage.

For example and not limitation, one class of work-pieces to which torque is applied includes nuts and bolts. One particular type of nut is a lug nut that attaches a vehicle wheel to a vehicle. The unfortunate situation in which lug nuts are difficult to remove from a vehicle wheel with a conventional wrench is well known. Lug nuts often become "frozen" in place when excess torque is applied to them when they are threaded onto their corresponding bolt or threaded stud. Lug nuts also often become "frozen" in place as a result of the accumulation of dirt and grime therearound. The difficulty in removing lug nuts often compounds an already difficult situation, such as having a flat tire. Thus, a tool that provides greater mechanical advantage than a conventional wrench is desirable.

A number of tools which provide greater mechanical advantage than conventional wrenches have been previously proposed. However, those previously proposed tools do not appear to have been generally accepted and commercialized. It is believed that the previously proposed tools have been too complex and cost prohibitive, or relatively difficult to use.

There is, therefore, a need in the industry for a method and tool for solving these and other related, and unrelated, problems.

SUMMARY OF THE INVENTION

Briefly described, the present invention includes a method of employing a fulcrum that is proximate to a work-piece to aid in the application of torque to the work-piece. A primary lever is gripped to the work-piece and a secondary lever is engaged to and pivoted about the fulcrum. The secondary lever engages the primary lever to cause the primary lever to pivot and apply torque to the work-piece.

More particularly, the present invention includes a torque multiplying assist tool for use with a wrench to aid in the operation of the wrench upon the work-piece. The assist tool functions as the secondary lever by receiving an applied force, pivoting about the fulcrum, and exerting a multiplied force upon the wrench. The wrench functions as the primary lever and includes a grip element that is engaged to the work-piece and a handle extending from the grip element. The multiplied force is applied to the handle of the wrench, such that torque is applied to the work-piece. In accordance with the preferred embodiments of the present invention, the assist tool is constructed and arranged to cooperate with a wrench to aid in the removal of lug nuts from a vehicle wheel. The work-piece is a lug nut (i.e., a primary lug nut) on the wheel and the fulcrum is another lug nut (i.e., a secondary lug nut) on the same wheel.

In accordance with the first preferred embodiment of the present invention, the assist tool is preferably employed with a conventional ratchet wrench or the like. The ratchet wrench includes a socket member and an elongated handle, both of which extend from a ratchet housing that encases a ratcheting mechanism. The assist tool includes a pivot assembly in the form of a socket member. The socket member of the assist tool is for engaging and pivoting about the secondary lug nut and an elongated handle is rigidly connected to and extends from the socket member of the assist tool for receiving the applied force. A linkage assembly in the form of an arm extends from the handle of the assist tool to engage and impart the multiplied force upon the handle of the ratchet wrench. The assist tool is constructed and arranged so that, when the socket member thereof is properly engaged to the secondary lug nut and the socket member of the ratchet wrench is properly engaged to the primary lug nut, the arm of the assist tool extends to engage the handle of the ratchet wrench. The arm includes an aperture for receiving the handle of the wrench. The arm is slidable along and selectively securable to the handle of the assist tool such that the torque multiplying effect of the assist tool is capable of being selectively varied.

In accordance with the second preferred embodiment of the present invention, the assist tool is preferably employed with a conventional lug wrench. The lug wrench includes a socket member and an elongated handle extending therefrom. The assist tool includes a pivot assembly that includes a socket member for engaging the secondary lug nut in a non-pivoting manner. In accordance with an alternate embodiment, the socket member engages the secondary nut in a pivoting manner. The pivot assembly further includes a rod-like extension extending from the terminus of the socket member and a sleeve that pivotally encircles the rod-like extension. An elongated handle extends generally radially from the sleeve in a first direction and a linkage assembly extends generally radially from the sleeve in a second direction. The linkage assembly extends from the assist tool to engage and impart a multiplied force upon the handle of the wrench. The linkage assembly includes a first arm that extends from the sleeve and a second arm that is pivotally connected to and extends from the first arm to engage the handle of the lug wrench. The second arm includes a plurality of apertures for receiving the handle of the lug wrench. The sleeve is preferably slid off of the extension, rotated end to end 180°, and slid back onto the extension to alternate the configuration of the assist tool between a tightening configuration and a loosening configuration.

In accordance with a first alternate embodiment of the present invention, an assist tool similar to that of the second preferred embodiment is employed with an improved lug wrench. When the socket of the improved lug wrench is upon a primary lug nut on a vehicle wheel, the handle of the improved lug wrench extends from the primary lug nut in a plane that is generally parallel to a plane extending through each of a plurality of lug nuts on the same vehicle wheel. By virtue of this configuration, the improved lug wrench seeks to minimize the chance that the socket of the improved lug wrench will slip off of the primary lug nut.

In accordance with second and third alternate embodiments of the present invention, a combined tool is provided that comprises an assist tool and a wrench similar to those of the first preferred embodiment that are joined so that they remain assembled to one another and generally properly oriented with respect to each other for convenient deployment as a single unit.

It is therefore an object of the present invention to provide a wrench assist tool and a method of using the same.

Another object of the present invention is to provide a tool that provides a mechanical advantage.

Yet another object of the present invention is to provide a torque multiplying tool.

Still another object of the present invention is to employ a fulcrum that is proximate to a work-piece.

Still another object of the present invention is to provide a tool that readily cooperates with a conventional wrench or the like.

Still another object of the present invention is to make it easier to remove lug nuts.

Still another object of the present invention is to make it easier to adequately torque lug nuts.

Still another object of the present invention is to make it easier to change a flat tire.

Other objects, features and advantages of the present invention will become apparent upon reading and understanding this specification, taken in conjunction with the accompanying drawings.

DETAILED DESCRIPTION OF THE PREFERRED EMBODIMENTS

Figure 1:
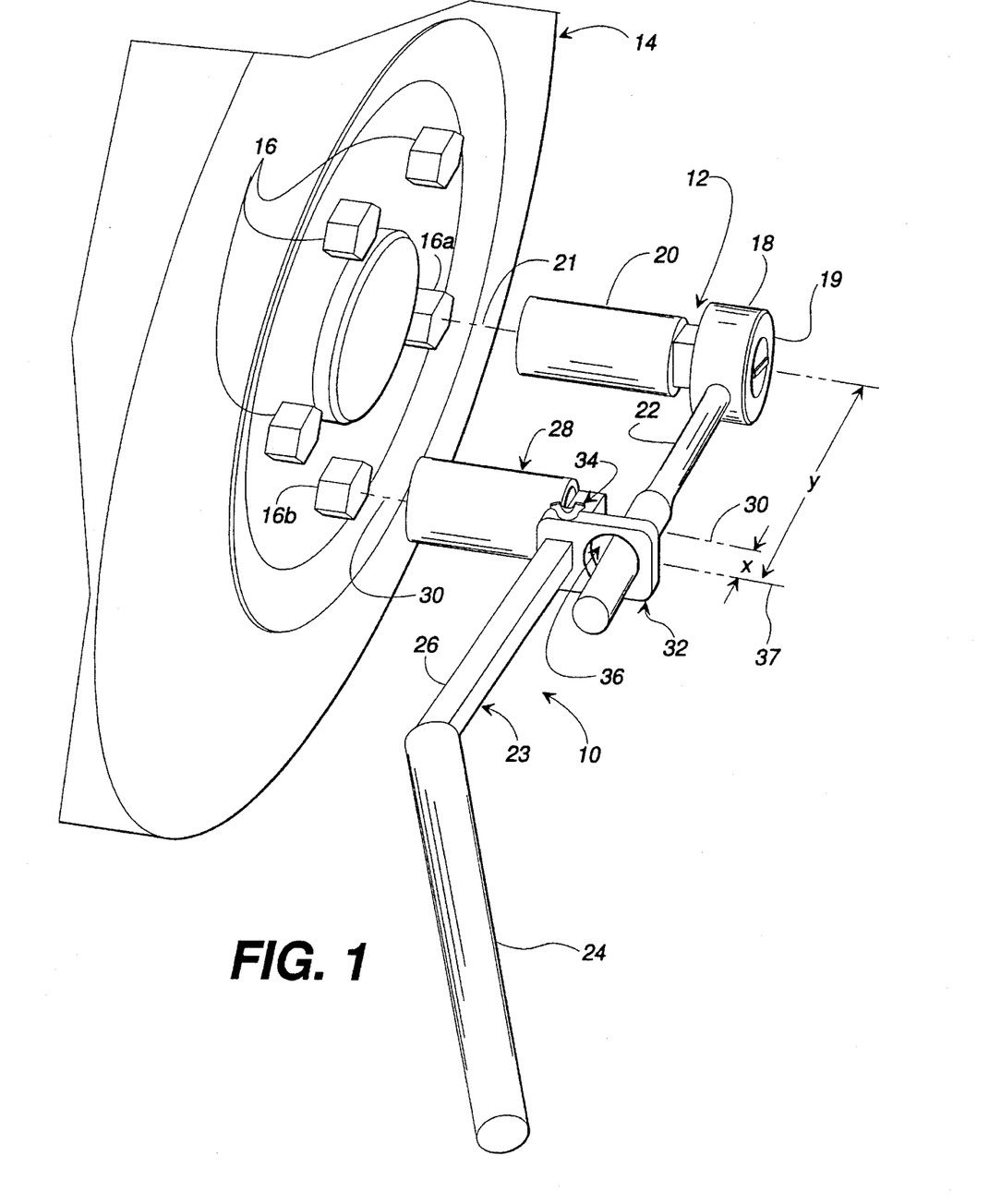
FIG. 1 is a perspective view of an assist tool engaged to a conventional ratchet wrench and exploded away from a portion of a conventional vehicle wheel, in accordance with a first preferred embodiment of the present invention.

Referring now in greater detail to the drawings, in which like numerals represent like components throughout the several views, FIG. 1 is a perspective view of an assist tool 10 cooperating with a conventional ratchet wrench 12 and exploded away from a portion of a conventional vehicle wheel 14, in accordance with a first preferred embodiment of the present invention. The wheel 14 includes a plurality of lug nuts 16. The ratchet wrench 12 includes a ratchet housing 18, and a wrench socket member 20 and a wrench handle 22 extending from the ratchet housing 18. The wrench socket member 20 grips any one of the plurality of lug nuts 16. The lug nut 16 that is actually gripped is referred to herein as a primary lug nut 16a. The wrench socket member 20 grips and pivots with the primary lug nut 16a about a primary axis of rotation 21 defined by the centerline of the primary lug nut 16a. The ratchet wrench 12 further includes a selectively rotatable knob 19. The knob 19 controls ratchet mechanisms (not shown) within the ratchet housing 18 to alter the direction in which the wrench socket member 20 will rotate about the primary axis of rotation 21 in response to movement of the wrench handle 22, as should be understood by those reasonably skilled in the art.

The assist tool 10 includes a elongated tool handle 23 that defines a rounded and smooth grip portion 24, for being comfortably clasped by a user, and a neck portion 26. A pivot assembly in the form of a tool socket member 28 is rigidly connected to the isolated end of the neck portion 26. The tool socket member 28 fits over and pivots relative to any one of the plurality of lug nuts 16. The lug nut 16 that is actually engaged by the tool socket member 28 is referred to herein as a secondary lug nut 16b. The tool socket member 28 pivots about a secondary axis of rotation 30 that is defined by the centerline of the secondary lug nut 16b. A linkage assembly in the form of an arm 32 extends from the neck portion 26 of the tool handle 23. The arm 32 is capable of sliding along the length of the neck portion 26 and is further capable of being selectively secured to the neck portion 26 by a winged set-screw 34, as will be discussed in greater detail below. The arm 32 defines an aperture 36 for receiving the wrench handle 22. As will be discussed in greater detail below, the arm 32 defines an arm centerline 37 that is a distance "x" rearward of the secondary axis of rotation 30, and a distance "y" is defined between the arm centerline 37 and the primary axis of rotation 21.

Figure 2:
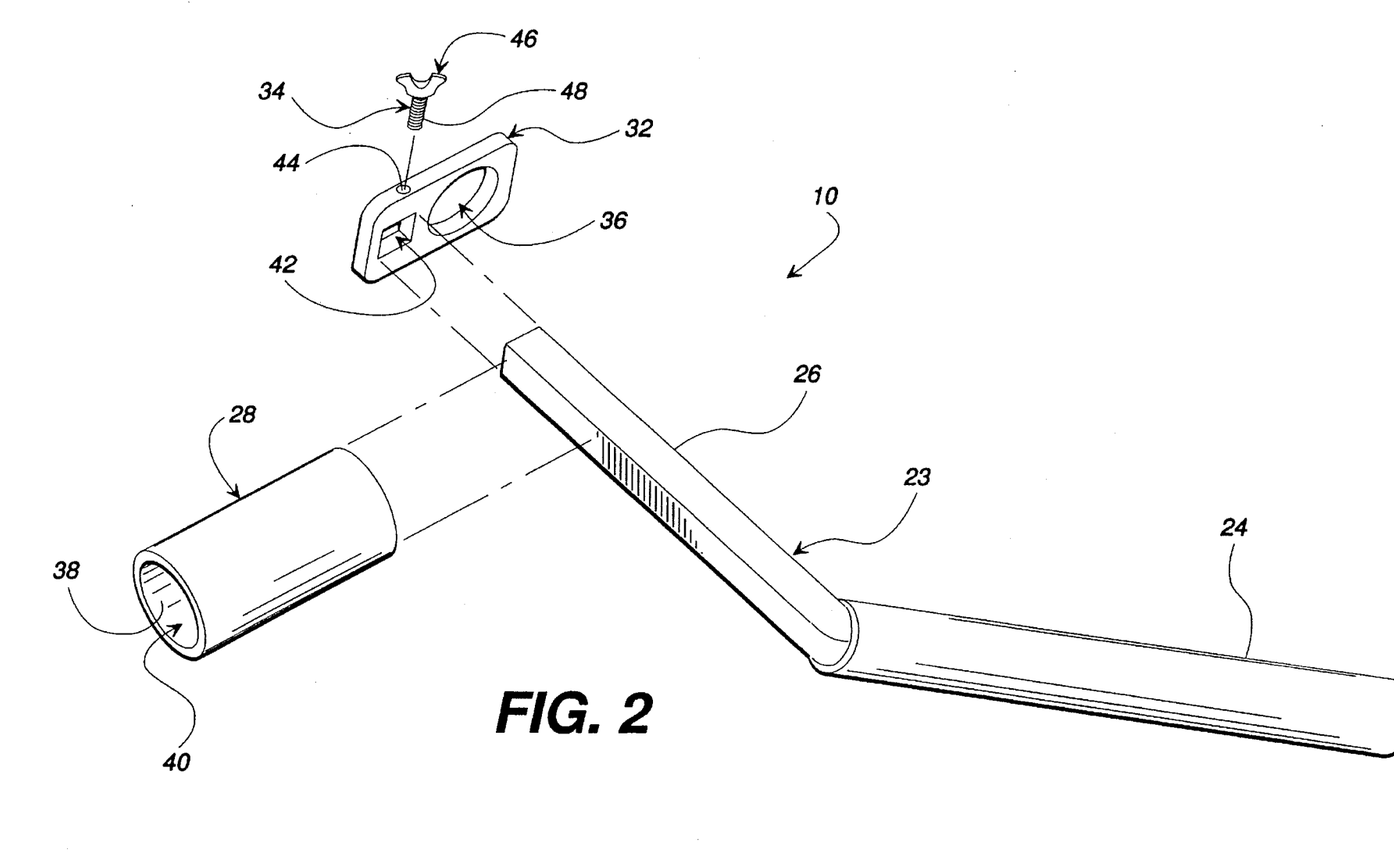
FIG. 2 is a perspective, exploded view of the assist tool of FIG. 1.

FIG. 2 is a perspective, exploded view of the assist tool 10 in accordance with the first preferred embodiment of the present invention. The tool socket member 28 includes an inner wall 38 that encircles and defines a cavity 40. The cavity 40 receives the secondary lug nut 16b (FIG. 1) and the inner wall 38 is preferably smooth to facilitate rotation of the tool socket member 28 relative to the secondary lug nut 16b while the secondary lug nut 16b is connected to the wheel 14 (FIG. 1) and disposed within the cavity 40. The arm 32 defines a second aperture 42 extending therethrough, and the neck portion 26 of the tool handle 23 extends through the aperture 42. A threaded bore 44 extends through the arm 32 from an edge thereof to the aperture 42. The set screw 34 cooperates with the bore 44 and includes wings 46 and a threaded shaft 48 depending therefrom. The threaded shaft 48 is capable of being selectively threaded through the threaded bore 44 so that the end of the threaded shaft 48 engages the neck 26 of the tool handle 23 to selectively preclude movement of the arm 32 relative to the tool handle 23. In accordance with alternate embodiments of the present invention, the set screw 34 and bore 44 are replaced with other devices that selectively preclude movement of the arm 32 with respect to the neck 26, as should be understood by those reasonably skilled in the art. For example, and not limitation, a spring loaded pin could protrude from the arm 32 and cooperate with indentations in the neck 26 to selectively prelude movement of the arm 32 with respect to the neck 26. In other alternate embodiments of the present invention, the arm 32 is rigidly secured to the neck 26.

Figure 3:
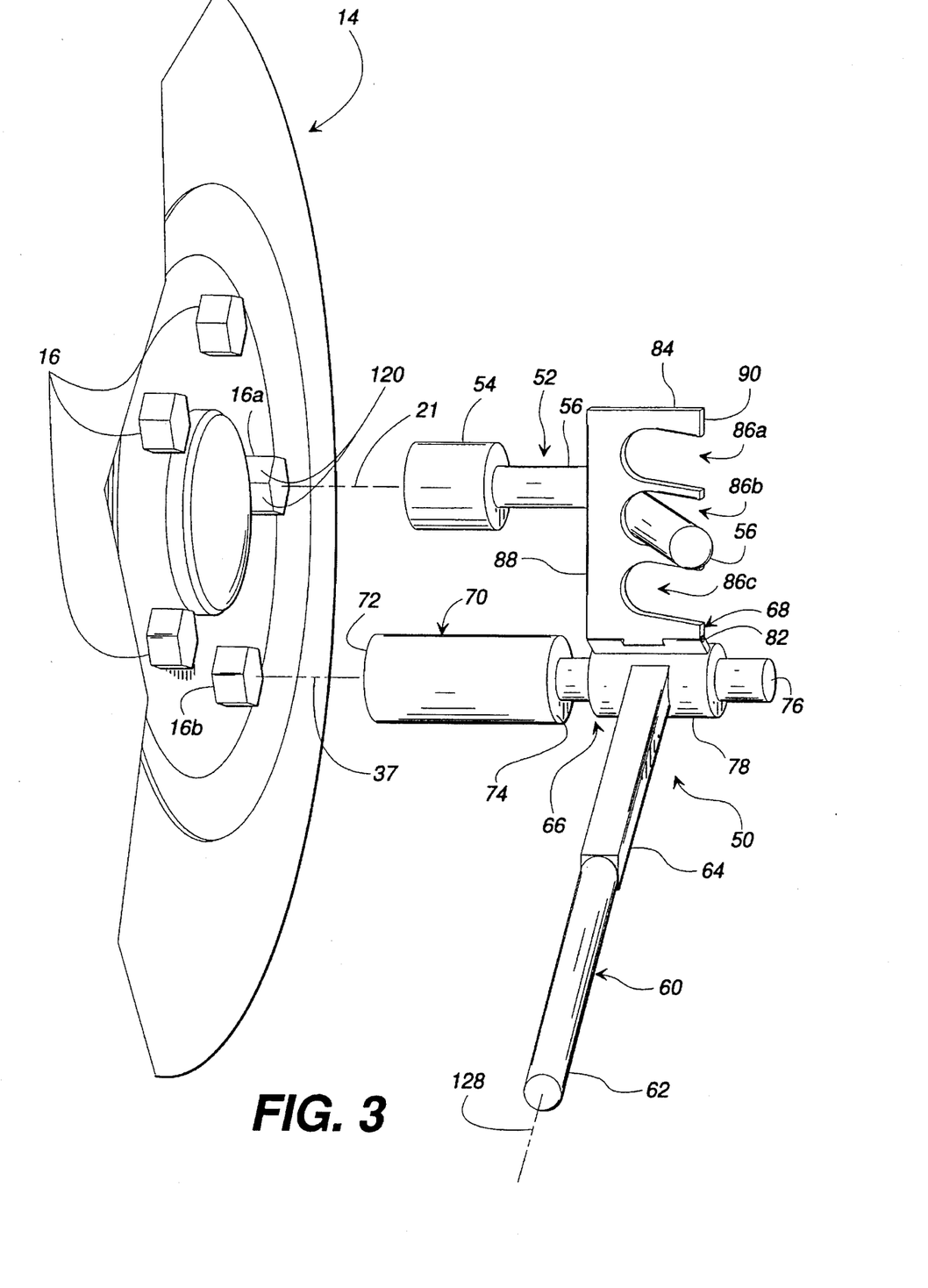
FIG. 3 is a perspective view of an assist tool engaged to a conventional lug wrench, wherein the assist tool is in a loosening configuration and exploded away from a portion of a conventional vehicle wheel, in accordance with a second preferred embodiment of the present invention.

FIG. 3 is a perspective view of an assist tool 50 cooperating with a conventional lug wrench 52, wherein the assist tool 50 is in a loosening configuration and exploded away from a portion of the conventional vehicle wheel 14, in accordance with a second preferred embodiment of the present invention. The lug wrench 52 includes a wrench socket member 54 and a wrench handle 56 extending from the wrench socket member 54. The wrench socket member 54 defines a cavity (not seen) that receives any one of the plurality of lug nuts 16. The lug nut 16 that is actually received by the cavity of the wrench socket member 54 is referred to herein as the primary lug nut 16a. The wrench socket member 54 grips the primary lug nut 16a and pivots therewith about the primary axis of rotation 21 defined by the centerline of the primary lug nut 16a. The assist tool 50 includes an elongated tool handle 60 that defines a rounded and smooth grip portion 62, that is capable of being comfortably clasped by a user, and a neck portion 64. A rotation assembly 66 is connected to and extends from the isolated end of the neck portion 64 of the tool handle 60 and a linkage assembly 68 is connected to and extends from the rotation assembly 66. The rotation assembly 66 includes a tool socket member 70 that fits over and removably connects to any one of the plurality of lug nuts 16. The lug nut 16 that is actually engaged by the tool socket member 70 is referred to herein as the secondary lug nut 16b. The tool socket member 70 engages the secondary lug nut 16b in a non-rotational manner. The tool socket member 70 includes a nut receiving end 72 and an opposite extension end 74. The rotation assembly 66 further includes an extension rod 76 that is rigidly connected to and protrudes from the extension end 74 of the tool socket member 70. The rotation assembly 66 further includes a sleeve 78 that encircles and is capable of pivoting about the extension rod 76. When the tool socket member 70 is properly fitted over the secondary lug nut 16b, the sleeve 78 is rotatable about the secondary axis of rotation 37. The tool handle 60 and linkage assembly 68 are rigidly connected to and protrude from the sleeve 78. In accordance with alternate embodiments of the present invention, the tool socket member 70 pivots about the secondary lug nut 16b when mated thereto. In accordance with other alternate embodiments of the present invention, not only does the tool socket member 70 pivot about the secondary lug nut 16b, but the tool handle 60 and linkage assembly 68 are rigidly connected to the socket member 70 or extensions therefrom.

In accordance with the second preferred embodiment of the present invention, the linkage assembly 68 includes a rigid arm 82 that is rigidly connected to the sleeve 78 and extends generally radially therefrom. The linkage assembly 68 further includes a pivot arm 84 that is pivotally connected to an edge of the rigid arm 82. The pivot arm 82 defines a plurality of apertures 86a–c, which are depicted in the form of slots, for receiving the wrench handle 56 of the lug wrench 52. The apertures 86 are constructed and arranged to individually receive the wrench handle 56, as discussed in greater detail below. The pivot arm includes an edge 88 and an opposite edge 90 at which the apertures 86 are accessible. The apertures 86 slant upwards by virtue of the fact that the entry portion of each aperture 86 along the edge 90 is lower than the terminus portion of each aperture 86 which is oriented toward the edge 88. In accordance with an alternate embodiment of the present invention, the apertures 86 are accessible at edge 88 rather than edge 90.

Figure 4:
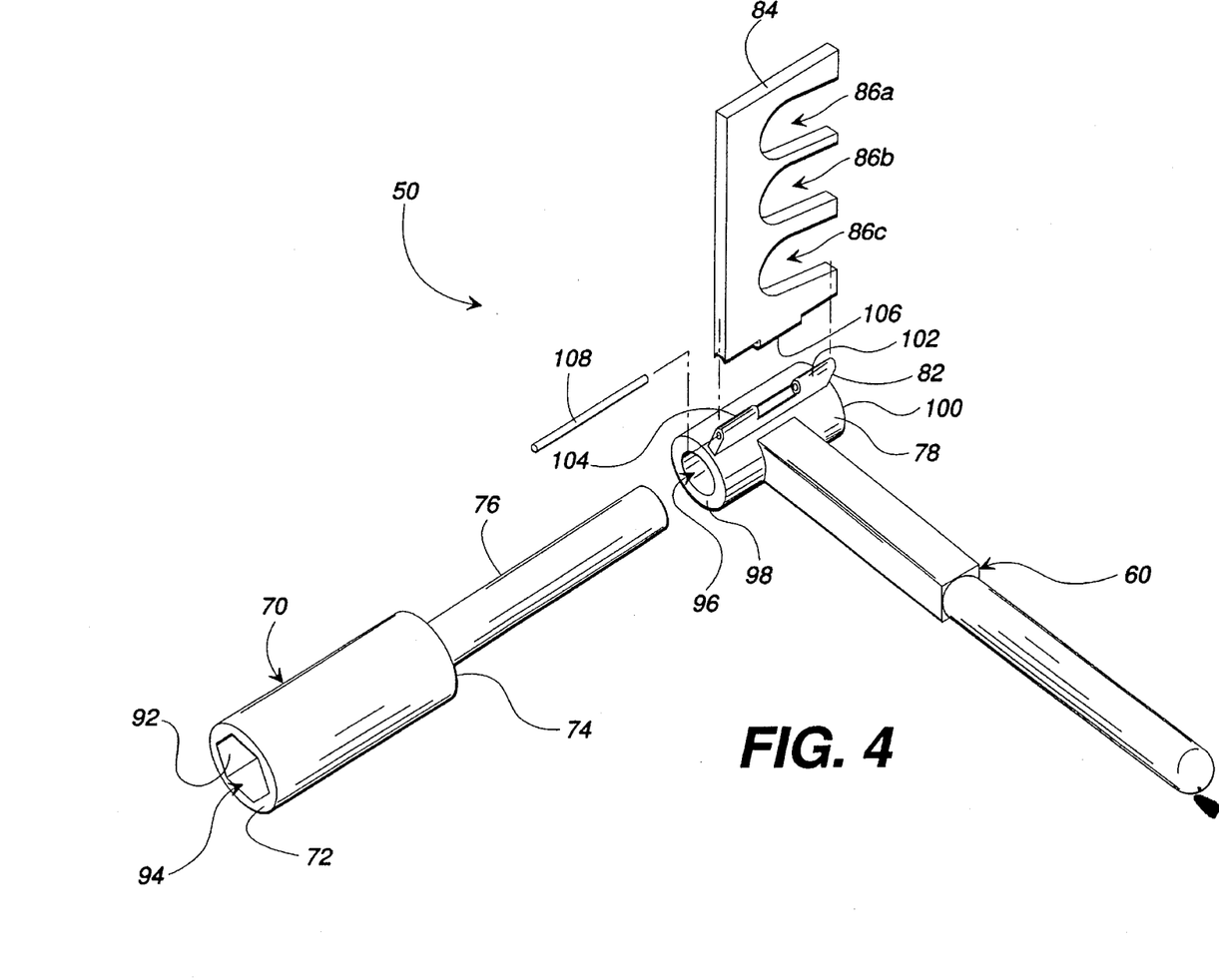
FIG. 4 is a perspective, exploded view of the wrench assist tool of FIG. 3.

FIG. 4 is a perspective, exploded view of the assist tool 50 of FIG. 3 in the loosening configuration, loosening being in the conventional counterclockwise sense of right handed threads, in accordance with the second preferred embodiment of the present invention. The tool socket member 70 includes an inner wall 92 that encircles and defines a cavity 94. The cavity 94 is accessible at the end 72 and receives the secondary lug nut 16b (FIG. 3). The cavity 94 is configured to preclude relative motion between the tool socket member 70 and the secondary lug nut 16b while the secondary lug nut 16b is disposed within the cavity 94. The inner wall 92 is depicted in FIG. 4 as defining a hexagonal shape that is complementary to the shape of the lug nuts 16. The sleeve 78 defines a bore 96 therethrough that extends between and is accessible at opposite ends 98, 100 of the sleeve 78. The extension rod 76 extends through the bore 96 and the sleeve 78 pivots freely around the extension rod 76 due to the complementary shapes of the bore 96 and the rod 76. As discussed previously, the top edge of the rigid arm 82 is hingedly connected to the bottom edge of the pivot arm 84. The hinged connection is facilitated by a pair of forked lobes 102, 104 extending from the upper edge of the rigid arm 82 and a middle lobe 106 depending from the bottom edge of the pivot arm 84. The middle lobe 106 is disposed between the forked lobes 102, 104 and bores defined in each of the lobes 102, 104, 106 align to receive an elongated pivot pin 108 which facilitates pivotal connection between the lobes 102,104,106.

Figure 5:
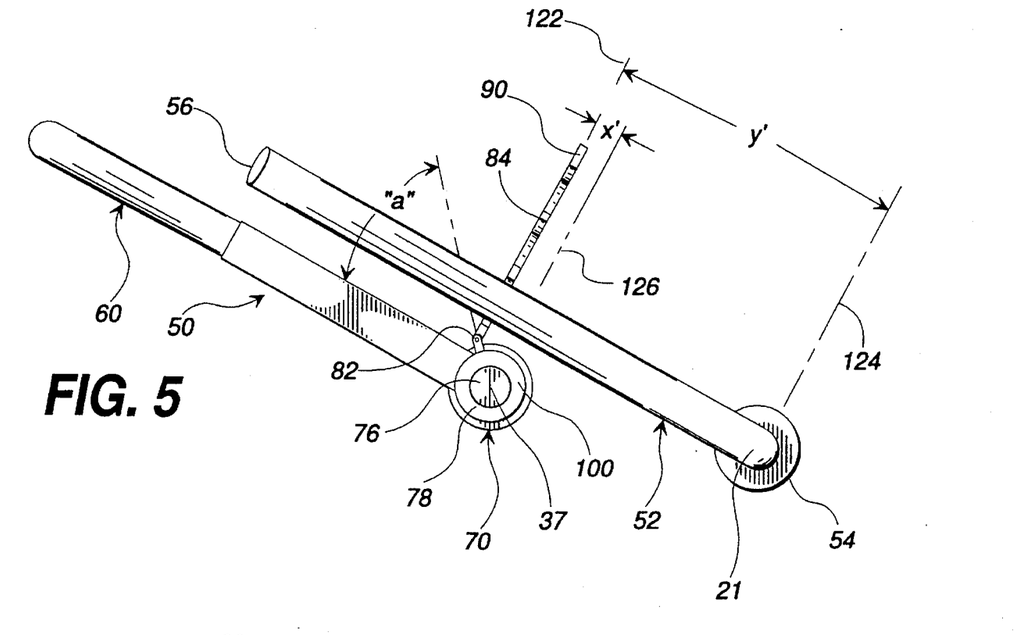
FIG. 5 is a side elevational view of the wrench assist tool and lug wrench of FIG. 3 in another loosening configuration.
Figure 6:
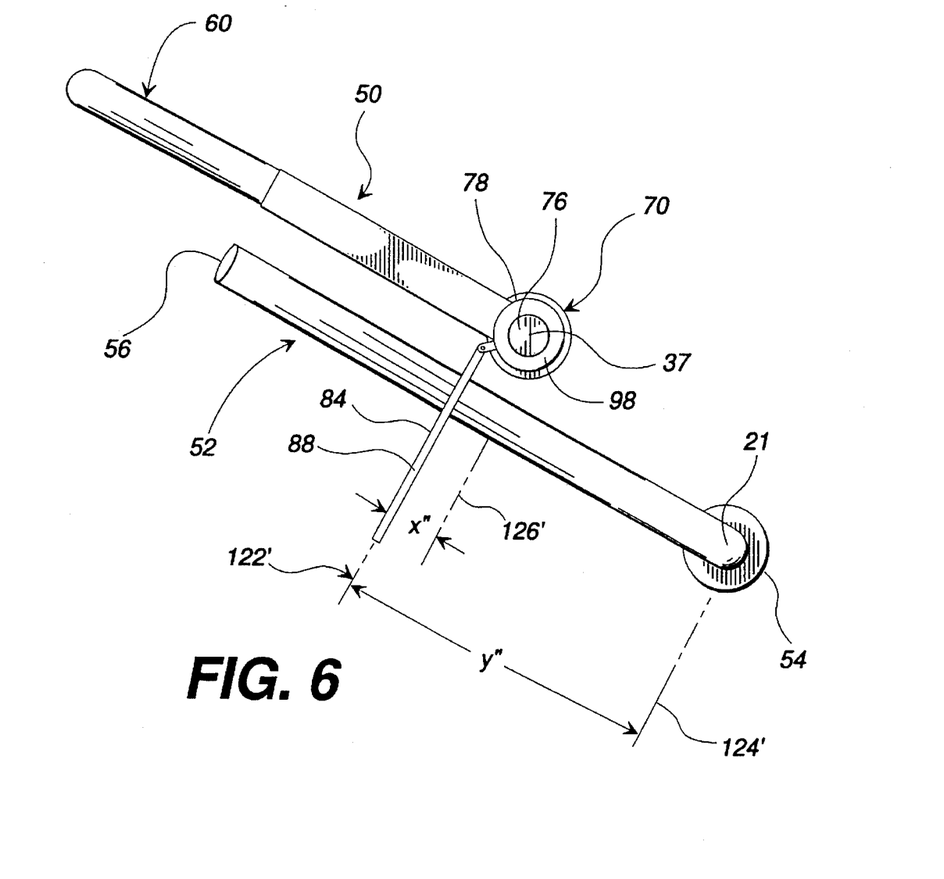
FIG. 6 is a side elevational view of the wrench assist tool and lug wrench of FIG. 3 in a tightening configuration, in accordance with the second preferred embodiment of the present invention.

FIG. 5 is a side elevational view of the assist tool 50 and lug wrench 52 in the loosening configuration, in accordance with the second preferred embodiment of the present invention. The view of FIG. 5 is from the side opposite from the cavity 94 (FIG. 4) defined within the tool socket member 70 and the cavity (not shown) defined within the wrench socket member 54. In other words, the view shows the edge 90 (see also FIG. 3) of the pivot arm 84 and the end 100 (see also FIG. 4) of the sleeve 78. The arrangement of the lug nuts 16 (FIGS. 1 and 3) has been altered in FIG. 5 such that the wrench handle 56 is disposed within the aperture 86c, as will be discussed in greater detail below. The pivot arm 84 defines an arm plane 122, and a parallel primary plane 124 and a parallel secondary plane 126 are defined through the primary axis of rotation 21 and the secondary axis of rotation 37, respectively. An angle "a", which is preferably acute, is defined between the rigid arm 82 and the tool handle 60. As a result, and as will be discussed in greater detail below, a distance "x"' is defined between the arm plane 122 and the secondary plane 126, and a distance "y"' is defined between the arm plane 122 and the primary plane 124. FIG. 6 is a side elevational view of the assist tool 50 and lug wrench 52 in a tightening configuration, in accordance with the second preferred embodiment of the present invention. The view of FIG. 6 is from the side opposite from the cavity 94 (FIG. 4) defined within the tool socket member 70 and the cavity (not shown) defined within the wrench socket member 54. While in the tightening configuration, the sleeve 78 is configured with respect to the extension rod 76 such that the end 100 (FIG. 4) of the sleeve 78 is oriented toward the tool socket member 70. Thus, in FIG. 6, edge 88 of the pivot arm 84 and the end 98 of the sleeve 78 are seen.

Figure 7:
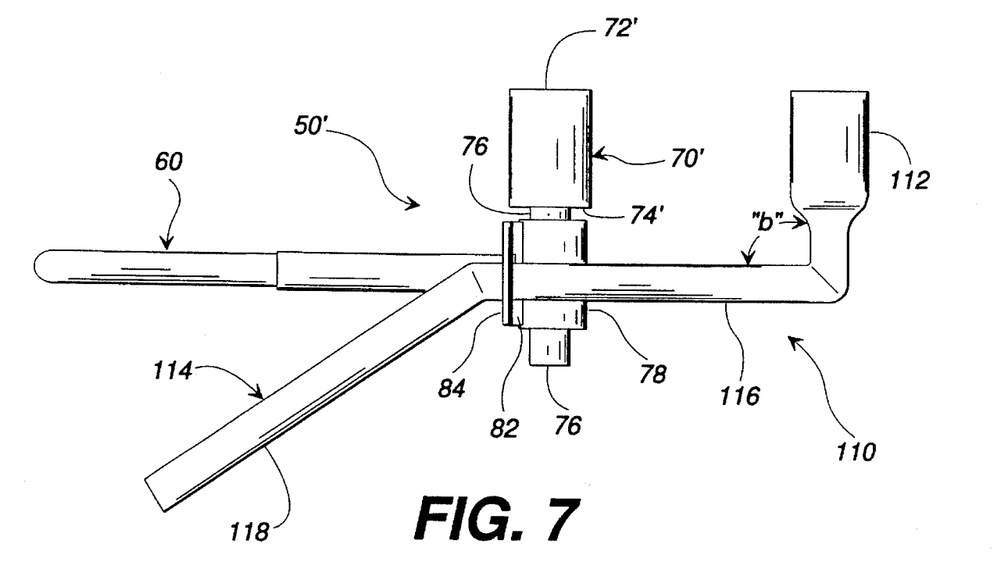
FIG. 7 is a top plan view of a wrench assist tool cooperating with a lug wrench, in accordance with a first alternate embodiment of the present invention.

FIG. 7 is a top plan view of an assist tool 50' cooperating with an improved lug wrench 110, in accordance with a first alternate embodiment of the present invention. The lug wrench 110 includes a conventional wrench socket member 112 for engaging and loosening lug nuts 16 (FIGS. 1 and 3) and an improved handle 114. The improved handle 114 includes a neck portion 116 that extends from the wrench socket member 112 to define an angle "b". The angle "b" is preferably approximately 90° such that, when the wrench socket member 112 of the lug wrench 110 properly engages a lug nut 16a of a plurality of lug nuts 16 connected to a vehicle wheel 14 (FIGS. 1 and 3), the neck portion 116 of the handle 114 extends in a plane that is generally parallel to a plane defined through the plurality of lug nuts 16. The handle 114 acceptably further includes a grip portion 118 that is connected to and flares outward from the terminus of the neck portion 116 of the handle 114. The pivot arm 84 of the assist tool 50' preferably engages the neck portion 116 of the handle 114. The assist tool 50' varies from the assist tool 50 (FIGS. 3–5) of the second preferred embodiment only in the dimensioning of the pivot assembly 66 (FIG. 3). More specifically, the length of the tool socket member 70' between ends 72',74' is less than the length of the tool socket member 70 (FIGS. 3–5) between the ends 72,74 (FIG. 3). This decrease in length is made possible, in part, by virtue of the angle "b" of the lug wrench 110.

Figure 8:
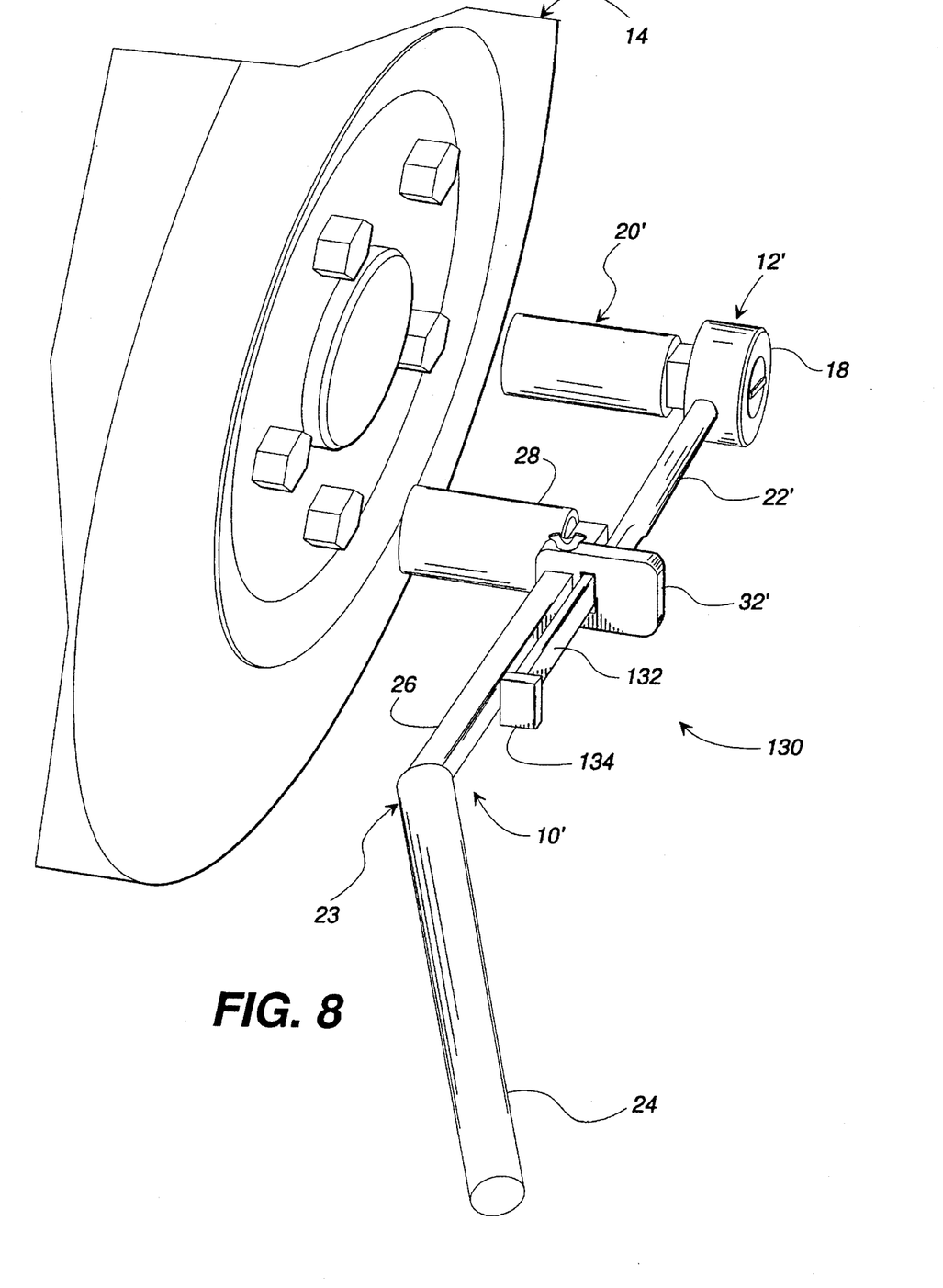
FIG. 8 is a perspective view of a combined tool exploded away from a portion of a conventional vehicle wheel, in accordance with a second alternate embodiment of the present invention.
Figure 9:
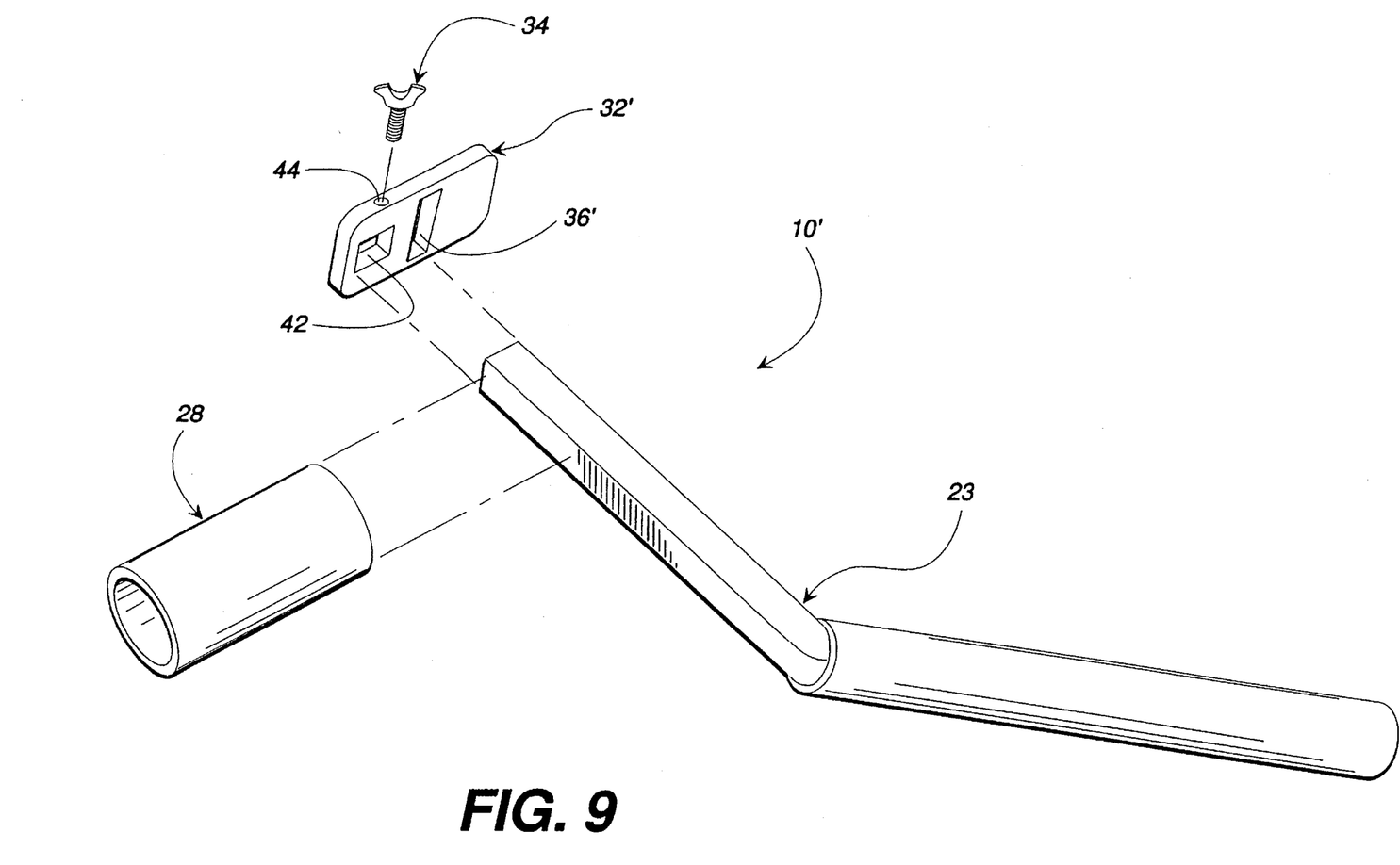
FIG. 9 is an isolated, perspective, exploded view of an assist tool portion of the combined tool of FIG. 8, in accordance with the second alternate embodiment of the present invention.

Referring back to FIG. 1, in accordance with certain alternate embodiments of the present invention, the assist tool 10 and ratchet wrench 12 are modified and joined so that they are a single unit. More particularly, the assist tool 10 and ratchet wrench 12 remain assembled to one another and generally properly oriented with respect to each other for convenient deployment as a single unit. A second and a third alternate embodiment of the present invention are examples of such alternate embodiments. FIG. 8 is a perspective view of a combined tool 130 exploded away from a portion of a conventional vehicle wheel 14, in accordance with the second alternate embodiment of the present invention. The combined tool 130 includes a modified assist tool 10' and a modified ratchet wrench 12'. The assist tool 10' is identical to the assist tool 10 (FIGS. 1 and 2) of the first preferred embodiment with the exception that the assist tool 10' includes a modified arm 32'. FIG. 9 is an isolated, perspective, exploded view of the assist tool 10' of the combined tool 130, in accordance with the second alternate embodiment of the present invention. As depicted in FIG. 9, the arm 32' includes a modified aperture 36' that is depicted as being generally rectangular in shape. Referring additionally to FIG. 8, the main difference between the ratchet wrench 12' and the ratchet wrench 12 (FIG. 1) of the first preferred embodiment of the present invention is that the ratchet wrench 12' includes a modified wrench handle 22' that includes a generally thin, rectangular portion 132 that extends through the aperture 36' (FIG. 9) defined through the arm 32' of the assist tool 10'. The aperture 36' and rectangular portion 132 of the wrench handle 22' cooperate such that the wrench handle 22' is capable of pivoting and translating, to at least a limited degree, with respect to the arm 32'. A flange 134 connected to the terminus of the rectangular portion 132 of the wrench handle 22' is too large to pass through the aperture 36', whereby the wrench handle 22' is connected to the assist tool 10'.

Figure 10:
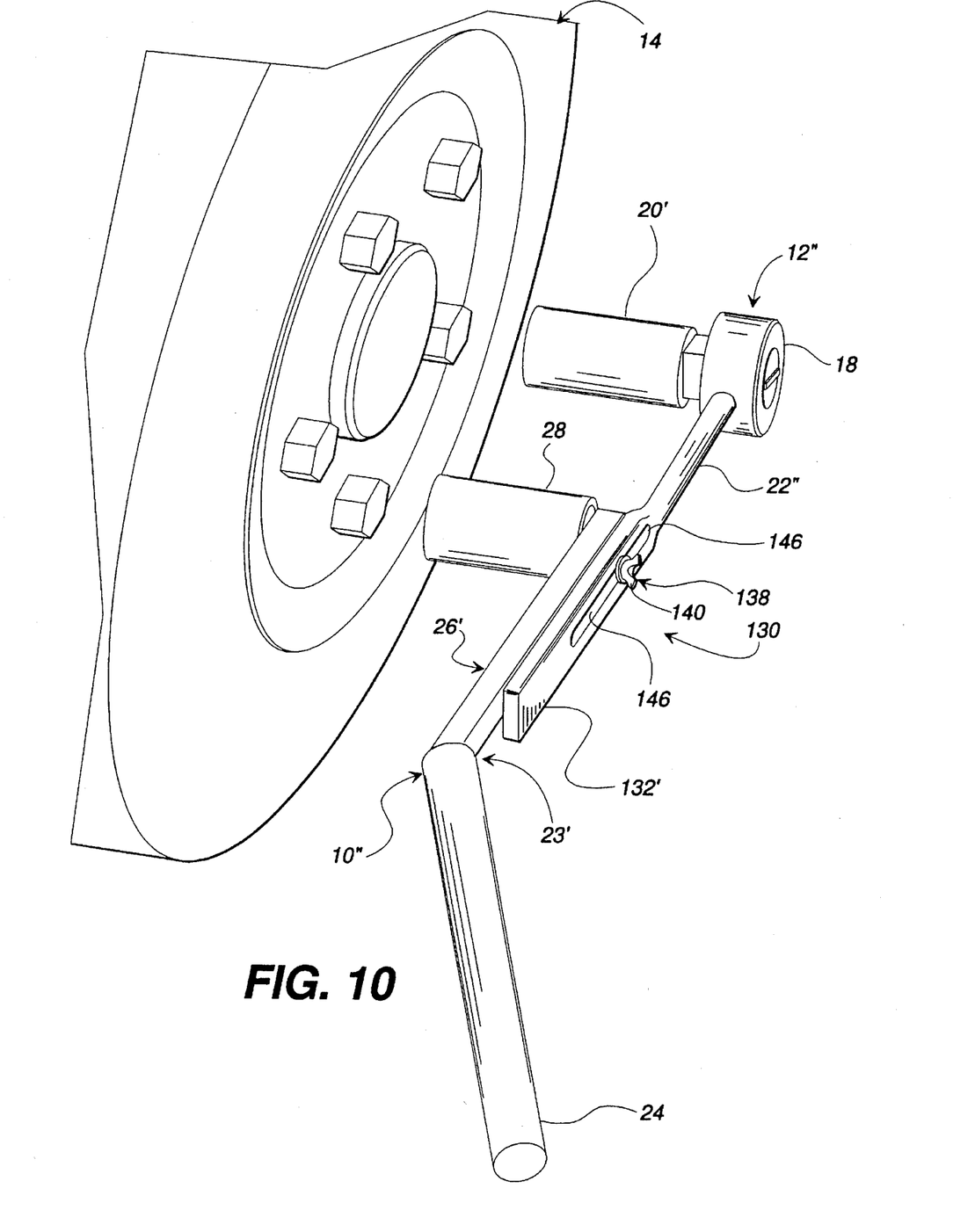
FIG. 10 is a perspective view of a combined tool exploded away from a portion of a conventional vehicle wheel, in accordance with a third alternate embodiment of the present invention.
Figure 11:
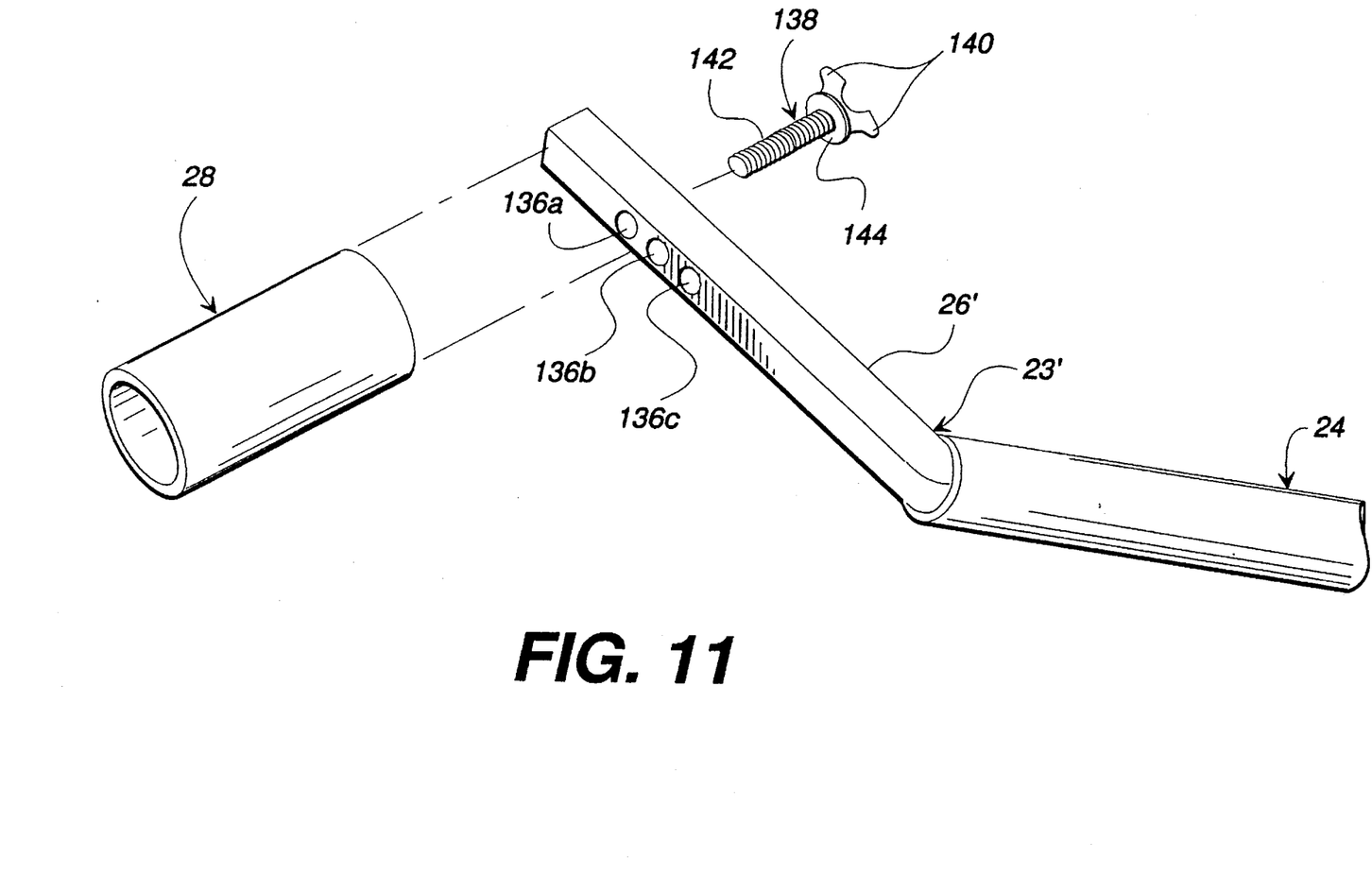
FIG. 11 is an isolated, perspective, partially cut-away, exploded view of an assist tool portion of the combined tool of FIG. 10, in accordance with the third alternate embodiment of the present invention.

FIG. 10 is a perspective view of a modified combined tool 130' exploded away from a portion of a conventional vehicle wheel 14, in accordance with the third alternate embodiment of the present invention. The combined tool 130' includes a modified assist tool 10" and a modified ratchet wrench 12" that are constructed and arranged so that they remain assembled to one another and generally properly oriented with respect to each other for convenient deployment as a single unit. The assist tool 10" is identical to the assist tool 10 (FIGS. 1 and 2) of the first preferred embodiment with the exception that the assist tool 10" includes a modified tool handle 23' and does not include the arm 32 (FIGS. 1 and 2). FIG. 11 is a partially cut-away, isolated, perspective, exploded view of the assist tool 10" of the combined tool 130', in accordance with the third alternate embodiment of the present invention. As depicted in FIG. 11, the tool handle 23' includes a modified neck portion 26'. The modified neck portion 26' includes a plurality of threaded bores 136*a–c* that extend through the neck portion 26'. A terminus portion of each bore 136 is seen in FIG. 11. An entry portion (not shown) of each bore 136 is located on the side of the neck portion 26' that is opposite from the side where the terminus portions of the bores 136 are located. A set screw 138 cooperates with the bores 136. The set screw 138 acceptably includes wings 140 from which a threaded shaft 142 extends. A washer 144 preferably encircles the shaft 142. The threaded shaft 142 is capable of being threaded into and out of each of the bores 136 individually. Referring additionally to FIG. 10, the main difference between the ratchet wrench 12" and the ratchet wrench 12 (FIG. 1) of the first preferred embodiment of the present invention is that the ratchet wrench 12" includes a modified wrench handle 22" that includes a generally thin, rectangular portion 132' that defines an elongated slot 146. The shaft 142 of the set screw 138 extends through the elongated slot 146 when the shaft 142 is threaded into the entry portion of one of the bores 136. In this configuration, the wrench handle 22" is capable of selectively pivoting and translating, to a limited degree, with respect to the arm 32'.

Alternate embodiments of the present invention, that are not shown but are similar to the third alternate embodiment, incorporate a bolt, rivet, pin, or the like, in the place of the set screw 138, and the bores 136 are varied accordingly. Those alternate embodiments preferably facilitate various positioning of the bolt, rivet, pin, or the like, to accommodate various spacing between lug nuts 16 (FIG. 1) and the ratcheting characteristics of an associated wrench. Regarding one particular of such alternate embodiments, which is not shown, the handle of an assist tool and the handle of a wrench each include a slot for receiving a pin. The pin passes through both slots so as to join the handles in an orientation similar to that of the third alternate embodiment. The slot in the handle of the assist tool extends generally lengthwise along the handle of the assist tool and includes two detents that are distal from each other along the length of the slot. The pin is spring-loaded and manually positionable within the slot in the handle of the assist tool. Each detent in the slot in the handle of the assist tool is shaped to restrain a head of the pin to prevent relative movement between the pin and the assist tool. The head of the pin is locked into a detent by placing the head of the pin proximate to the detent and then releasing the spring-loaded feature of the pin. The length of the slots and the positioning of the detents in the slot of the assist tool is dictated by the various spacings between pairs of lug nuts 16 on a vehicle wheel 14 (FIG. 1) and the ratcheting characteristics of the wrench.

Referring back to FIG. 1, in operation, the assist tool 10 functions to inventively multiply the torque applied to the primary lug nut 16*a*. Torque multiplication is achieved, in accordance with the first preferred embodiment of the present invention, by configuring the assist tool 10 and ratchet wrench 12 as depicted in FIG. 1. The tool socket member 28 is mated to one lug nut 16 and the wrench socket member 20 is mated to another of the lug nuts 16. While the socket members 20,28 are depicted as for engagement to lug nuts 16*a, b*, respectively, in FIG. 1, the socket members 20,28 can be mated to other parings of lug nuts 16, and it is not necessary that the lug nuts 16 be neighboring, as are the lug nuts 16*a,b*. Once the socket members 20,28 are properly mounted to the lug nuts 16*a,b*, the knob 19 of the ratchet wrench 12 is manipulated so that the ratcheting mechanism (not shown) within the ratchet wrench 12 is in the desired tightening or loosening mode, as should be understood by those reasonably skilled in the art. It is assumed throughout the following discussion that the lug nuts 16 are threaded in the most conventional manner. To loosen the primary lug nut 16*a*, a user-applied force is applied to the tool handle 23 of the assist tool 10 (i.e., the secondary lever) to pivot the assist tool 10 counterclockwise about the secondary lug nut 16*b* (i.e., the fulcrum) and secondary axis of rotation 30, whereby the ratchet wrench 12 (i.e., the primary lever) is pivoted counterclockwise about the primary axis of rotation 21 to loosen the primary lug nut 16*a* (i.e., the work-piece). To tighten the primary lug nut 16*a*, the knob 19 of the ratchet wrench 12 is manipulated accordingly and a user-applied force is applied to the tool handle 23 to pivot the assist tool 10 clockwise about the secondary lug nut 16*b* and the secondary axis of rotation 30, whereby the ratchet wrench 12 is pivoted clockwise about the primary axis of rotation 21 to tighten the primary lug nut 16*a*. In both the tightening and the loosening situations, the primary lug nut 16*a* tends to resist rotation. The user-applied force creates a secondary torque in the assist tool handle 23, and a multiplied force is applied by the arm 32 of the assist tool 10 to the ratchet wrench 12. In response to the multiplied force, the wrench 12 applies a primary torque to the primary lug nut 16*a* about the primary axis of rotation 21. The primary torque is, in theory, proportional to the secondary torque multiplied by "y" and divided by "x". Hence, torque multiplication is achieved.

As the foregoing mathematical relationship indicates, an increased mechanical advantage is achieved by decreasing the dimension "x". In accordance with the first preferred embodiment of the present invention, the dimension "x" is capable of being varied by loosening the set screw 34, sliding the arm 32 along the neck portion 26 of the tool handle 23, and then securing the arm 32 by tightening the set screw 34. The dimension "x" is preferably maintained large enough so that the ratchet capability of the ratchet wrench 12 is maintained. In other words, it is preferable that, in response to pivoting of the assist tool 10, the wrench handle 22 pivots to a sufficient degree about the primary axis of rotation 21 so that the ratchet mechanism (not shown) within the ratchet housing 18 ratchets properly. Proper ratcheting is also achieved by slightly, but not excessively, over sizing the aperture 36 in the arm 32 so that the wrench handle 22 is capable of pivoting relative to the arm 32. By thus maintaining the ratchet capability of the ratchet wrench 12, the present invention functions such that the tool handle 23 is capable of being repetitively pivoted in a ratchet like fashion to repetitively effect rotation of the wrench socket member 20 and the primary lug nut 16*a* about the primary axis of rotation 21. However, such ratcheting, while convenient, is not required. For example, in accordance with alternate embodiments of the present invention, the assist tool 10, or variants thereof, is employed with a plurality of different alternate wrenches that are not ratchet wrenches 12. Each alternate wrench of the plurality of alternate wrenches preferably includes a handle that is capable of being oriented in a multiplicity of positions relative to a nut 16 gripped by the alternate wrench. Certain of these alternate wrenches include radially-symmetrical drive-and-socket pairs that mate and define, for example and not limitation, polygonal, toothed, grooved, splined, notched, scored, knurled, burred, keyed, or star designs. Certain of these alternate wrenches also include universal joints.

Referring back to FIG. 3, in accordance with the second preferred embodiment of the present invention, the assist tool 50 functions to inventively multiply the torque applied to the primary lug nut 16*a* under the same general theory that the assist tool 10 (FIG. 1) functions to multiply the torque applied to the primary lug nut 16*a*. To operate the assist tool 50 in combination with the lug wrench 52 they are configured in a manner similar to that in which they are depicted and the socket members 54,70 are mated, for example, to lug nuts 16*a,b*, respectively. While the socket members 54,70 are depicted as for engagement to lug nuts 16*a,b*, respectively, in FIG. 3, the socket members 54, 70 can be mated to other parings of lug nuts 16, and it is not necessary that the lug nuts 16 be neighboring, as are lug nuts 16*a, b*. As discussed in greater detail below, once properly configured the assist tool 50 is pivoted to pivot the lug wrench 52 and the lug nut 16*a*. There are some differences between the operation of the assist tool 50 and the operation of the assist tool 10. For example, in accordance with the second preferred embodiment of the present invention, the assist tool 50 is not capable of being repetitively pivoted in a ratchet like fashion to repetitively effect rotation of the wrench socket member 54 and the primary lug nut 16*a* about the primary axis of rotation 21 because a ratchet wrench 12 (FIG. 1) is not employed with the assist tool 50. However, in alternate embodiments of the present invention, the assist tool 50 is employed with a ratchet wrench 12 or the like.

An additional difference between the operation of the assist tool 50 and the operation of the assist tool 10 pertains to the apertures 86. The assist tool 50 preferably includes a plurality of apertures 86 in the pivot arm 84 thereof for receiving the wrench handle 56 of the lug wrench 52. In contrast, the assist tool 10 (FIG. 1) preferably includes a single aperture 36 (FIG. 1) in the arm 32 (FIG. 1) thereof for receiving the wrench handle 22 (FIG. 1). Referring back to FIG. 1, a single aperture 36 is sufficient in accordance with the first preferred embodiment because the ratchet mechanism (not shown) within the ratchet housing 18 of the ratchet wrench 12 allows the wrench handle 22 to pivot through a wide range of motion such that the wrench handle 22 is capable of being readily aligned with the aperture 36. Referring back to FIG. 3, however, in accordance with the second preferred embodiment of the present invention, a conventional lug wrench 52 is employed. The wrench handle 56 of the lug wrench 52 is not capable of pivoting through a wide range of motion with respect to the primary lug nut 16*a* when the wrench socket member 54 is mated to the primary lug nut 16*a*. Rather, by removing the wrench socket member 54 from the primary lug nut 16*a*, pivoting the lug wrench 52, and re-mating the wrench socket member 54 to the primary lug nut 16*a*, the wrench handle 56 of the lug wrench 52 is capable of only being incrementally pivoted with respect to the primary lug nut 16*a* and the primary axis of rotation 21. Such pivoting is restricted to increments that correspond to the angles defined between adjacent flat surfaces 120 defined by the primary lug nut 16*a*. Assuming that the lug nuts 16 are hexagonal, as they are depicted in FIG. 3, the angle defined between adjacent flat surfaces 120 on the lug nuts 16 is 60°. Thus, the wrench handle 56, when the wrench socket member 54 is mated to the primary lug nut 16*a*, is restricted to being positioned at 60° increments with respect to the primary axis of rotation 21. The pivot arm 84 of the assist tool 50 is constructed and arranged to accommodate for this restricted positioning of the wrench handle 56, irrespective of the angular orientation of the primary lug nut 16*a* with respect to the primary axis of rotation. More particularly, the pivot arm 84 defines a length, measured in the direction extending away from the rigid arm 82, and the apertures 86 extend and are arranged along that length so that the wrench handle 56 can be received into an aperture 86 irrespective of the angular orientation of the primary lug nut 16*a* with respect to the primary axis of rotation 21. More particularly, the pivot arm 84 is preferably constructed and arranged to enable the wrench handle 56 of the lug wrench 52 to be fitted into an aperture 86 when the socket members 54,70 are mated to the lug nuts 16a,b and the angle defined between the handles 56,60, when viewed from the side as depicted in FIG. 5, is any value between 0° and the angle defined between adjacent flat surfaces 120 on the lug nuts 16 (i.e., any value between 0° and 60° for hexagonal lug nuts 16). For example, referring to FIG. 3, the wrench handle 56 is in the aperture 86b, and referring to FIGS. 5 and 6 the wrench handle is in the aperture 86c (FIG. 4).

Another difference between the assist tool 50 and the assist tool 10 (FIGS. 1 and 2) has to do with their configuration for tightening and loosening lug nuts 16. As discussed above, the assist tool 10, in combination with the ratchet wrench 12 (FIG. 1), functions to both tighten and loosen lug nuts 16 when configured as depicted in FIG. 1. However, the assist tool 50 is, in accordance with the second preferred embodiment, configured differently for tightening and loosening. The assist tool 50 is configured in a loosening configuration in FIGS. 3 and 5. While in the loosening configuration, the sleeve 78 is configured with respect to the extension rod 76 such that the end 98 (FIG. 4) of the sleeve 78 is oriented toward the tool socket member 70. To loosen the primary lug nut 16a, the assist tool 50 and lug wrench 52 are configured in the loosening configuration and the socket members 54,70 are mated, for example, to the lug nuts 16a, b, respectively. A user-applied force is applied to the tool handle 60 to pivot the assist tool 50 counterclockwise about the secondary axis of rotation 37, whereby the lug wrench 52 is pivoted counterclockwise about the primary axis of rotation 21 to loosen the primary lug nut 16a. Referring to FIG. 5, the user-applied force creates a secondary torque in the assist tool handle 60, and a multiplied force is applied by the pivot arm 84 of the assist tool 50 to the lug wrench 52. In response to the multiplied force, the lug wrench 52 applies a primary torque to the primary lug nut 16a (FIG. 3) about the primary axis of rotation 21. The primary torque is, in theory, proportional to the secondary torque multiplied by "y'" and divided by "x'". Hence, torque multiplication is achieved. As discussed above, the apertures 86 slam upwards by virtue of the fact that the entry portion of each aperture 86 along the edge 90 is lower that the terminus portion of each aperture 86 which is oriented toward the edge 88. This slanting functions in a manner that seeks, during loading, to bias the wrench handle 56 toward the edge 88 and thereby restrain the wrench handle 56 within an aperture 88 when the user-applied force is applied to the assist tool 50.

Referring back to FIGS. 3 and 4, the assist tool 50 is converted from the tightening configuration (FIGS. 3 and 5) to the loosening configuration (FIG. 6) by sliding the sleeve 78 off of the extension rod 76, rotating the tool handle 60 180° angularly about the elongated axis 128 (FIG. 3) of the tool handle 60, and sliding the sleeve 78 back onto the extension rod 76, whereby the end 100 (FIG. 4) of the sleeve 78 is oriented toward the tool socket member 70. To tighten a lug nut 16 (FIGS. 1 and 3), the assist tool 50 and lug wrench 52 are configured, for example, as shown in FIG. 6 and the socket members 54,70 are mated accordingly to the lug nuts 16a, b (FIGS. 1 and 3), respectively. (Obviously the vehicle wheel 14 (FIGS. 1 and 3) would have been rotated from the orientation of FIGS. 1 and 3 for the assist tool 50 and lug wrench 52 to be configured as depicted in FIG. 6.) Referring further to FIG. 6, a user-applied force is applied to the tool handle 60 to pivot the assist tool 50 clockwise about the secondary axis of rotation 37, whereby the lug wrench 52 is pivoted clockwise about the primary axis of rotation 21 to tighten the primary lug nut 16a. The user-applied force creates a secondary torque in the assist tool handle 60, and a multiplied force is applied by the pivot arm 84 of the assist tool 50 to the lug wrench 52. In response to the multiplied force, the lug wrench 52 applies a primary torque to the primary lug nut 16a (FIG. 3) about the primary axis of rotation 21. The primary torque is, in theory, proportional to the secondary multiplied by "y'"" and divided by "x'"". Hence, torque multiplication is achieved.

Referring back to FIG. 7, the assist tool 50' operates in combination with the lug wrench 110 in the same general manner in which the assist tool 50 (FIGS. 3–5 and 6) operates with the lug wrench 52 (FIGS. 3, 5, and 6). Importantly, however, the assist tool 50' and the lug wrench 110 are constructed and arranged and cooperate such that the handles 60,114 thereof are, in operation, maintained very proximate to the vehicle wheel 14 (FIGS. 1 and 3). Such proximity to the vehicle wheel 14 seeks to prevent the slipping of the socket members 70',112 off of the lug nuts 16a,b. Referring back to FIGS. 8–11, the combined tools 130, 130' operate in a manner that is generally similar to the manner in which the assist tool 10 (FIGS. 1 and 2) and ratchet wrench 12 (FIG. 1) operate once assembled, as should be understood by those reasonably skilled in the art upon understanding this disclosure.

While certain of the preferred and alternate embodiments of the present invention have been disclosed herein, other embodiments of the methods and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It will also understood that any relative dimensions and relationships shown on the drawings are provided for example only and the scope of the invention is not to be limited thereby. Furthermore, the equivalents of all means-or-step-plus-function elements in the following claims are intended to include any structure, material, or acts for performing the function as specifically claimed which would be known by persons reasonably skilled in the art of this disclosure.

I claim:

1. In combination:
   a wheel including
     a first lug nut that is threadedly engaged to the wheel to define a first axis of rotation, and
     a second lug nut;
   a wrench including
     a grip element gripping said first lug nut, and
     an elongated handle connected to and extending from said grip element; and
   an assist tool including
     a pivot assembly pivotally and removably connected to said second lug nut for rotating about said second lug nut to define a second axis of rotation that is displaced from said first axis of rotation,
     an elongated member connected to and extending from said pivot assembly for receiving an applied force, and
     a linkage assembly connected between said assist tool and said handle of said wrench at a position that is displaced from said first axis of rotation,
   wherein upon application of the applied force to said elongated member of said assist tool, said elongated member rotates about said second axis of rotation and a second force is applied by said linkage assembly to said handle causing said wrench to apply a torque to said first lug nut and rotate about said first axis of rotation.

2. The combination of claim 1, wherein said elongated member includes a first end and a second end, wherein said pivot assembly includes a socket member defining a cavity therein and including a first end, wherein said cavity is accessible at said first end for receiving the second lug nut, and a second end, wherein said socket member and said elongated member are interconnected at a point that is proximate to both said second end of said socket member and said first end of said elongated member, wherein said linkage assembly includes an arm connected to said elongated member between said socket member and said second end of said elongated member, and wherein said arm defines a first aperture occupied by said handle of said wrench.

3. The combination of claim 1, wherein said pivot assembly includes a socket member defining a cavity therein and including a first end, wherein said cavity is accessible at said first end for receiving the second lug nut, and a second end, an extension extending from said second end of said socket member, and a sleeve pivotally connected to and at least partially encircling said extension, wherein said elongated member is connected to and extends from said sleeve, and wherein said linkage assembly includes a first arm including a first end connected to said sleeve and a second end displaced from said sleeve, and a second arm pivotally connected to and extending from said second end of said first arm and defining an aperture occupied by said handle of said wrench.

4. The combination of claim 1, wherein said pivot assembly includes a socket member wherein said socket member defines a cavity therein, and wherein said socket member includes a first end that defines an opening to said cavity, wherein said second lug nut extends through said opening into said cavity.

5. The combination of claim 1, wherein said linkage assembly defines a point of pivotal connection between said handle of said wrench and said assist tool, wherein a first distance is defined between said point of pivotal connection and said first axis of rotation, wherein a second distance is defined between said point of pivotal connection and said second axis of rotation, and wherein said first distance is greater than said second distance such that torque enhancement is achieved.

6. The combination of claim 5, further comprising a means for changing the position of said point of pivotal connection such that the relationship between said first distance and said second distance is changed.

7. An assist tool for use with a wrench, or the like, to aid in the operation of the wrench upon a work-piece in response to an applied force, wherein the work-piece is proximate to a fulcrum, wherein the wrench includes a grip element that is removably connected to the work-piece and a first elongated member extending from the grip element, and wherein the assist tool comprises:

a pivot assembly for removably and pivotably connecting to the fulcrum;

a second elongated member connected to and extending from said pivot assembly for receiving the applied force; and a linkage assembly interposed and pivotally connected between the assist tool and the first elongated member, wherein the assist tool is constructed and arranged such that upon application of the applied force to said second elongated member a second force is transferred by said linkage assembly to the first elongated member causing the wrench to rotate about a first axis of rotation and apply a torque to the work-piece, and said pivot assembly rotates about the fulcrum to define a second axis of rotation that is generally parallel to said first axis of rotation, said linkage assembly defines a point of pivotal connection between the first elongated member and the assist tool, a first distance is defined between said point of pivotal connection and said first axis of rotation, a second distance is defined between said point of pivotal connection and said second axis of rotation, and said first distance is greater than said second distance such that torque enhancement is achieved, and wherein the assist tool further comprises a means for changing the position of said point of pivotal connection such that the relationship between the first distance and the second distance is changed.

8. The assist tool of claim 7, wherein said elongated member includes a first end and a second end, wherein said pivot assembly includes, at least, a socket member defining a cavity therein and including a first end, wherein said cavity is accessible at said first end for receiving the first lug nut, and a second end, wherein said socket member and said elongated member are interconnected at a point that is proximate to both said second end of said socket member and said first end of said elongated member, and wherein said linkage assembly is connected to said elongated member between said second end of said socket member and said elongated member.

9. The tool of claim 8, wherein said linkage assembly includes an arm connected to and extending from said elongated member, and wherein said arm defines a first aperture for receiving the handle of the wrench.

10. The tool of claim 7, wherein said arm is movably connected to said elongated member and movable at least a limited distance between said first end and said second end of said elongated member.

11. The tool of claim 7, wherein said elongated member includes a first end connected to said pivot assembly and a second end displaced from said pivot assembly, and wherein said linkage assembly includes an arm extending from said pivot assembly for connecting to the handle of the wrench.

12. The tool of claim 7, wherein said pivot assembly includes a socket member defining a cavity therein and including
a first end, wherein said cavity is accessible at said first end for receiving the first lug nut, and
a second end,
an extension extending from said second end of said socket member, and
a sleeve pivotally connected to and at least partially encircling said extension,
wherein said elongated member is connected to and extends from said sleeve, and
wherein said arm extends from said sleeve.

13. The tool of claim 11, wherein said arm defines an aperture for receiving the handle of the wrench.

14. The tool of claim 7, wherein said arm is pivotally connected to said pivot assembly.

15. The tool of claim 7,
wherein said elongated member includes a first end connected to said pivot assembly and a second end displaced from said pivot assembly, and
wherein said linkage assembly includes
a first arm including
a first end connected to said pivot assembly, and
a second end displaced from said pivot assembly,
a hinge connected to said second end of said first arm, and
a second arm extending from said hinge.

16. The assist tool of claim 15, wherein said second arm defines an aperture for receiving the handle of the wrench.

17. An assist tool for use with a wrench, or the like, to aid in the operation of the wrench upon a work-piece in response to an applied force, wherein the work-piece is proximate to a fulcrum, wherein the wrench includes a grip element that is removably connected to the work-piece and a first elongated member extending from the grip element, and wherein the assist tool comprises:
a pivot assembly for removably and pivotably connecting to the fulcrum;
a second elongated member connected to and extending from said pivot assembly for receiving the applied force, wherein said second elongated member extends in the same general direction as the first elongated member; and
a linkage assembly interposed and pivotally connected between the assist tool and the first elongated member, wherein the first elongated member extends from the work-piece generally toward and to a position that is beyond the fulcrum, wherein said linkage assembly is connected to the first elongated member at said position that is beyond the fulcrum, and wherein the assist tool is constructed and arranged such that
upon application of the applied force to said second elongated member
a second force is transferred by said linkage assembly to the first elongated member causing the wrench to rotate about a first axis of rotation and apply a torque to the work-piece, and
said pivot assembly rotates about the fulcrum to define a second axis of rotation that is generally parallel to said first axis of rotation,
said linkage assembly defines a point of pivotal connection between the first elongated member and the assist tool,
a first distance is defined between said point of pivotal connection and said first axis of rotation,
a second distance is defined between said point of pivotal connection and said second axis of rotation, and said first distance is greater than said second distance such that torque enhancement is achieved.

18. An assist tool for use with a wrench, or the like, to aid in the operation of the wrench upon a work-piece in response to an applied force, wherein the work-piece is proximate to a fulcrum, wherein the wrench includes a grip element that is removably connected to the work-piece and a first elongated member extending from the grip element, and wherein the assist tool comprises:
a pivot assembly for removably and pivotably connecting to the fulcrum, wherein said pivot assembly includes a socket member, wherein said socket member defines a cavity therein, and wherein said socket member includes a first end at which said cavity is accessible;
a second elongated member connected to and extending from said pivot assembly for receiving the applied force; and
a linkage assembly interposed and pivotally connected between the assist tool and the first elongated member, wherein the assist tool is constructed and arranged such that
upon application of the applied force to said second elongated member
a second force is transferred by said linkage assembly to the first elongated member causing the wrench to rotate about a first axis of rotation and apply a torque to the work-piece, and
said pivot assembly rotates about the fulcrum to define a second axis of rotation that is generally parallel to said first axis of rotation,
said linkage assembly defines a point of pivotal connection between the first elongated member and the assist tool,
a first distance is defined between said point of pivotal connection and said first axis of rotation,
a second distance is defined between said point of pivotal connection and said second axis of rotation, and
said first distance is greater than said second distance such that torque enhancement is achieved.

19. The assist tool of claim 18, wherein in an end elevational view of said first end of said socket member, said cavity of said socket member is generally polygonal.

20. The assist tool of claim 18, wherein in an end elevational view of said first end of said socket member, said cavity of said socket member is generally circular.

21. A tool that facilitates the application and removal of a first lug nut on a vehicle wheel by cooperating with a second lug nut on the vehicle and responding to an applied force, the tool comprising:
a wrench including
a gripping element for gripping and defining a first axis of rotation with the first lug nut, and
a handle connected to and extending from said gripping element; and
an assist tool,
wherein said assist tool includes
a pivot assembly for pivotally and removably connecting to the second lug nut and defining a second axis of rotation relative to the second lug nut, wherein said second axis of rotation is generally parallel to said first axis of rotation,
an elongated member connected to and extending from said pivot assembly for receiving the applied force, and
a linkage assembly connected between said assist tool and said handle of said wrench such that a point of pivotal connection is defined between said handle and said assist tool, wherein upon application of the applied force to said elongated member, said pivot assembly rotates about said second axis of rotation and a second force is transferred by said linkage assembly to said handle causing said wrench to rotate about said first axis and apply a torque to the first lug nut, wherein a first distance is defined between said point of pivotal connection and said first axis of rotation, wherein a second distance is defined between said point of pivotal connection and said second axis of rotation, and wherein said first distance is greater than said second distance such that torque enhancement is achieved.

22. The tool of claim 21, wherein said handle of said wrench and said elongated member of said assist tool extend in the same general direction.

23. The tool of claim 21, further comprising a means for changing the position of said point of pivotal connection such that the relationship between said first distance and said second distance is changed.

24. The tool of claim 21, wherein said pivot assembly includes a socket member defining a cavity therein and including a first end at which said cavity is accessible for receiving the second lug nut.

* * * * *